United States Patent [19]

McGee et al.

[11] Patent Number: 4,571,528

[45] Date of Patent: Feb. 18, 1986

[54] ELECTROMAGNETIC ROTARY MOTOR

[75] Inventors: Daniel W. McGee, Batavia, Iowa; Stephan Rosinski, Boothwyn, Pa.; Claude S. Setzer, Fairfield, Iowa

[73] Assignee: Magna Motive Industries, Inc., Fairfield, Iowa

[21] Appl. No.: 689,021

[22] Filed: Jan. 4, 1985

Related U.S. Application Data

[63] Continuation of Ser. No. 506,439, Jun. 21, 1983, abandoned.

[51] Int. Cl.[4] ............................................. H02K 29/00
[52] U.S. Cl. ....................................... 318/138; 310/46; 310/154; 310/156; 310/266; 318/254
[58] Field of Search .................... 310/46, 49, 154, 156, 310/266; 318/138, 254

[56] References Cited

U.S. PATENT DOCUMENTS

| | | | |
|---|---|---|---|
| 1,863,294 | 6/1932 | Bogia | 310/46 |
| 3,426,224 | 2/1969 | Esters | 310/266 X |
| 3,539,845 | 11/1970 | Stcherbatcheft | 310/46 |
| 3,665,227 | 5/1972 | Busch | 310/46 |
| 3,754,155 | 8/1973 | Oudet | 310/266 X |
| 3,922,590 | 11/1975 | Warren et al. | 318/138 |
| 4,025,807 | 5/1977 | Clover | 310/46 |
| 4,070,592 | 1/1978 | Snowdon et al. | 310/266 X |
| 4,151,431 | 4/1979 | Johnson . | |
| 4,181,867 | 1/1980 | Müller | 310/46 X |
| 4,357,551 | 11/1982 | Dulondel | 310/46 |
| 4,482,849 | 11/1984 | Doemen et al. | 318/130 |

FOREIGN PATENT DOCUMENTS 1578025  5/1976  United Kingdom .
1572586  3/1978  United Kingdom .

OTHER PUBLICATIONS

Hyypia, "Amazing Magnet-Powered Motor", Spring 1980, pp. 45-47 & 114-117, Science & Mechanics.
Walker, "The Amateur Scientist", date unknown, pp. 146-150 & 152, publication unknown.
"Magnetic 'Wankel' for Electric Cars", *Popular Science,* Jun., 1979.
Publication: "Advances in Modern Technology," Znanie Publishers, 1980, Moscow.

*Primary Examiner*—Donovan F. Duggan
*Attorney, Agent, or Firm*—Bell, Seltzer, Park & Gibson

[57] ABSTRACT

An electromagnetic rotary motor including a stator means, a rotor means and an electronic control means for inducing an electromagnetic field. The stator means includes a permanent magnet means having pole faces that define a gap between them with a generally uniform magnet flux density thereacross. The gap has an entrance section, an exit section and a generally curved longitudinal path extending from the entrance section to the exit section around a transverse axis. The magnetic flux density changes as one moves from the entrance section to the exit section as a function of arc degree position around the transverse axis. The rotor means includes a predetermined number of permanent magnets disposed radially outwardly from the rotor axis. These rotor magnets are disposed substantially within the gap and the magnetic field of each rotor magnet interacts with the magnetic field of the stator magnets through repulsion or attraction. The electronic control means induces an electromagnetic field that interacts with a magnetic field of a rotor magnet.

28 Claims, 19 Drawing Figures

ELECTROMAGNETIC ROTARY MOTOR

This application is a continuation of application Ser. No. 506,439 filed June 21, 1983 now abandoned.

BACKGROUND OF THE INVENTION

This invention relates to a motor that produces a useful, working output based, at least in part, upon the use of a unique arrangement and configuration of permanent magnets. Conventional electric motors employ a changing electrical current to generate an electromagnetic field that interacts with a receptive ferrous material or another magnetic field to create a force and induce movement. The present invention relies upon the energy provided by an electromagnet that is stored in the interacting fields of the stator and rotor permanent magnets for at least a part of its prime motive force.

The motor disclosed herein stores the energy in the interacting magnetic fields of permanent magnets, such as rare earth cobalt magnets. They represent a significant step forward in magnetic energy product and coercive force. Although the composition of these magnets is not a part of the present invention, their properties make the present invention more practical from an economic standpoint. Rare earth cobalt magnets are from twenty to fifty times more resistant to demagnetization than conventional Alnico magnets. As a result, rare earth cobalt magnets may be used in applications for which other magnets were not considered due to their propensity to demagnetize in the presence of a reverse magnetic field of comparable strength.

Based upon the general theories of magnetism, it is believed that each electron in an atom exhibits properties associated with an electric charge spinning on its own axis and producing a small magnetic moment. The sum of these magnetic moments may add collectively to cause the atom to behave as a small magnet. When the atoms are placed into an external magnetic field, each one tends to align with the field, and when the external magnetic field is removed the material usually retains a residual magnetism. If the residual magnetism is strong and difficult to neutralize, i.e. if the magnet has a high coercive force, then the material is commonly known as a "permanent magnet."

In most magnetic materials the magnetic field utilized to align the atomic magnets is sufficient, when reversed in polarity, to disalign or demagnetize the material. This demagnetizing force is referred to as the coercive force $H_c$ and is defined as the magnetizing force required to bring the induction (magnetic flux density or magnetic flux per unit area) to zero in a magnetic material which is in a symmetrically cylically magnetized condition.

For an ordinary Alnico magnet, if a field equal to the coercive force is applied to the magnet to drive its magnetic flux density to zero, and is then removed, the flux will rebound only slightly. The magnet will effectively be demagnetized and remain so until it is remagnetized by another externally generated magnetic field. This happens because the coercive force $H_c$ is nearly the same as the intrinsic coercive force $H_{ci}$. The intrinsic coercive force $H_{ci}$ is the magnetizing force required to bring to zero the intrinsic induction in a magnetic material, or the contributions of all of the elementary atomic magnets.

For a rare earth cobalt magnet, if a field equal to the coercive force $H_c$ is applied to the magnet to drive its magnetic flux density to zero, and is then removed, the flux will rebound almost to its original value. Permanent magnets having this characteristic will commonly have a hysterisis loop exhibiting square loop characteristics. This is due to the fact that rare earth cobalt magnets have values for intrinsic coercive forces $H_{ci}$ that are several times larger (twenty to fifty times) than the values for ordinary coercive force $H_c$. Thus, the flux density may be repeatedly driven to zero without adversely affecting the magnet's intrinsic magnetization. This permits the magnet to be used in applications heretofore considered impractical because of the demagnetization that would occur. Although a number of theories have been proposed, it is not yet well known why rare earth cobalt magnets have such properties.

Additional information about the composition of rare earth cobalt magnets and information about their manufacture, characteristics, or uses is readily available in public literature. These magnets have greatly enhanced the operation and power output of the present invention, but they are not an essential part thereof. One may substitute other permanent magnets, such as Alnico magnets, although with less successful results. One may also substitute other sources of magnetic flux, whether generated electrically or by permanent magnets or a combination thereof.

An example of a permanent magnet motor is shown in U.S. Pat. No. 4,151,431 to Johnson, which illustrates that permanent magnets may be used to do useful work. However, it differs from the present invention by using the combined forces of attraction and repulsion, and by using a markedly different mechanical configuration. Moreover, the present invention has a generally uniform magnetic flux density across its stator gap, which the Johnson motor does not have.

SUMMARY OF THE INVENTION

Thus, it is an object of the present invention to provide a permanent magnet motor of the type described which produces a useable work output.

It is a further object of the present invention to provide a permanent magnet motor that derives at least a portion of its work output from the energy (provided by an electromagnet) that is stored in the interacting fields of its permanent magnets.

It is a further object of the invention to provide a permanent magnet motor having a unique yet straightforward design to minimize production and manufacturing costs.

It is a further object of the invention to provide a permanent magnet motor incorporating magnets having a strong resistance to demagnetization.

It is a further object of the invention to provide a permanent magnet motor which operates without producing pollutants or excessive noise.

Further and additional objects will appear from the description, accompanying drawings and appended claims.

In accordance with an embodiment of the invention, a permanent magnet motor includes a stator means, a rotor means, and an electronic control means. The stator means includes permanent magnet means having pole faces that define a gap between them with a generally uniform magnetic flux density thereacross. The gap has an entrance section, an exit section, and a generally curved longitudinal path defining a transverse axis. The magnetic flux density changes as one moves from the entrance section to the exit section as a function of arc degree position around the transverse axis. The rotor means includes a predetermined number of permanent magnets disposed radially outwardly from the rotor axis. These rotor magnets are disposed substantially within the gap and the magnetic field of each rotor magnet interacts with the magnetic field of the stator magnets, through repulsion or attraction. The electronic control means induces an electromagnetic field that interacts with the magnetic field of a rotor magnet or the stator magnets to selectively enhance or retard the rotational speed of the rotor.

DESCRIPTION OF THE INVENTION

The invention disclosed herein maximizes the derivation of work from the energy stored in the interacting fields of permanent magnets, such as those made from rare earth cobalt, by moving a rotor permanent magnet through stationary magnetic fields created by stator permanent magnets. In one embodiment of this invention the distance between opposing stator magnet pole faces continuously increases from one position to the next, and the magnetic forces between the pole faces decreases in inverse proportion to or as a function of the squared distance from the pole face. Due to the difference in forces acting upon the rotor magnet, it is accelerated toward that section of the stator having a wider distance between the poles, until it escapes from the field.

FIGS. 1 through 5 are simplified diagrams to illustrate exemplary magnetic forces between the stator and rotor magnets, and to provide a basic understanding of the operation of the present invention. The structure to support the stator and rotor permanent magnets shown in FIGS. 1 through 5 has been eliminated for clarity, but it is shown in FIGS. 6 through 13B which illustrate the presently contemplated preferred embodiments and structures for practicing the present invention.

Figure 1:
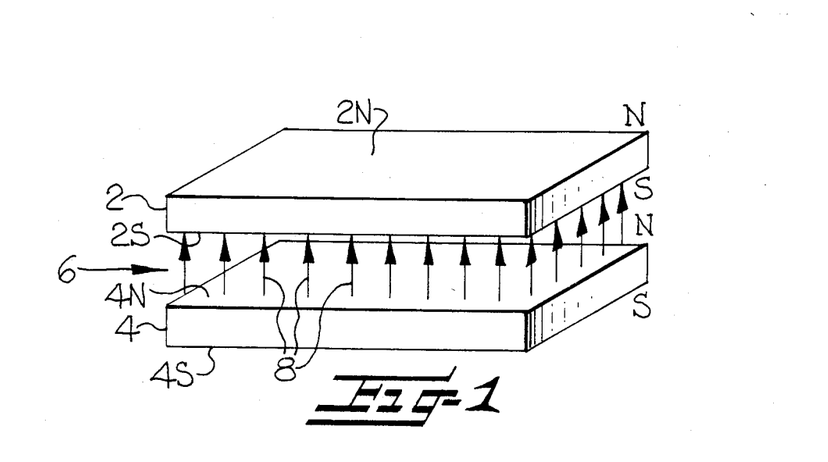
FIG. 1 is a perspective view of two generally planar and parallel magnets oriented with opposite polarity poles facing each other. The vectors represent magnetic field lines in the gap between the two magnets.

Referring to FIG. 1, a pair of generally parallel permanent magnets 2, 4, each shaped as a rectangular prism, are maintained in a fixed spaced relationship that defines a gap 6 therebetween. Each magnet has its north (N) and south (S) poles, 2N, 2S, 4N, 4S, respectively, on the larger faces thereof. Opposite polarity poles, such as 2S, 4N, face each other across the gap 6 so that the magnetic fields interact, resulting in an attractive force between the magnets 2, 4. The ideal undisturbed magnetic field lines in the gap 6 are indicated by the plurality of magnetic induction vectors 8 and illustrate the uniform magnetic flux density between the pole faces 2S, 4N and within the gap 6. Outside of the gap 6 the magnetic flux density becomes non-uniform. The true magnetic field lines are more complex, but they have been drawn as straight lines to illustrate the scientific principles involved in this invention. These magnets 2, 4 represent the stator magnets of the present invention.

Figure 2:
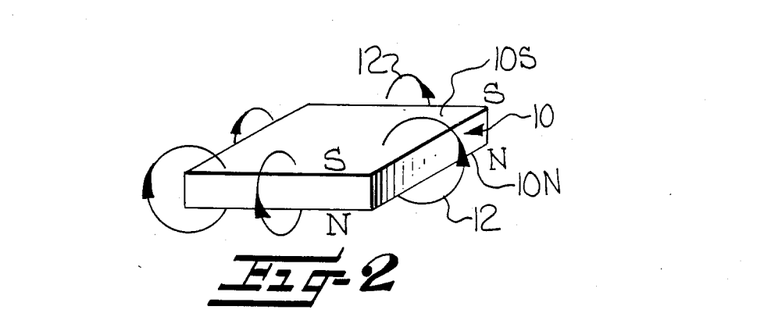
FIG. 2 is a perspective view of a generally planar magnet illustrating its associated magnetic field lines.

Referring to FIG. 2, a single permanent magnet 10 is shaped as a rectangular prism and has its north and south poles on the larger faces 10N, 10S thereof. The ideal undisturbed magnetic field lines are again indicated by a plurality of magnetic induction vectors 12. The magnetic flux density surrounding this magnet is not uniform and varies as a function of the location around the magnet and the distance from the magnet pole face 10S or 10N. This magnet represents a rotor magnet of the present invention.

Figure 3:
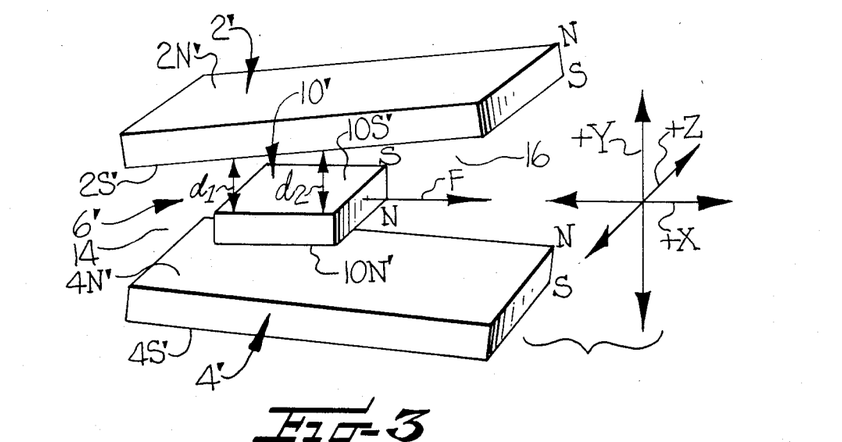
FIG. 3 is a perspective view of two generally planar and parallel magnets as in FIG. 1, oriented so that one is slightly inclined with respect to the other, and further having a planar magnet, as in FIG. 2, therebetween.

Referring to FIG. 3, the generally parallel stator magnets of FIG. 1 are sloped, or have their pole faces inclined, with respect to one another so as to be truly parallel only along the indicated Z axis. Thus, magnets 2', 4' have opposite polarity pole faces 2S', 4N' that face one another and define a gap 6'. The inclined orientation of the two magnets 2', 4' results in the gap 6' having a narrower entrance section 14 at one end and a wider exit section 16 at the opposite end. A single permanent magnet 10' is disposed in the gap 6'. It is generally parallel to magnets 2', 4' and equidistant from the two, assuming that each has the same strength magnetic field. The single magnet 10' is oriented so that its faces are repulsed by the faces of the two outer magnets 2', 4'. Thus, with respect to the Y axis, equal and opposite repulsive forces are generated between faces 2S' and 10S' and faces 4N' and 10N'. However, the distance between the faces of the center and stator magnets increases as one moves along the indicated positive X axis. Thus, the distance $d_1$ between faces 10S' and 2S' near the gap entrance section 14 is less than the distance $d_2$ between the same faces at a location closer to the gap exit section 16. As a result, the repulsive forces between the center and stator magnets are greater when the center magnet is nearer the gap entrance section 14, than they are when the center magnet is nearer the gap exit section 16. The net effect is a force F that accelerates the center magnet towards the gap exit section 16.

All of the embodiments disclosed herein disclose the stator and rotor magnets operating in the repulsion mode. It is to be understood that the invention is equally applicable to stator and rotor magnets operating in the attraction mode. This may be done in the embodiment of FIG. 3 by turning over the center magnet 10 to reverse the polarity thereof. The net result is a force (not illustrated) that accelerates the center magnet toward the gap entrance section 14, in the opposite direction of the illustrated force F.

Figures 4, 5:
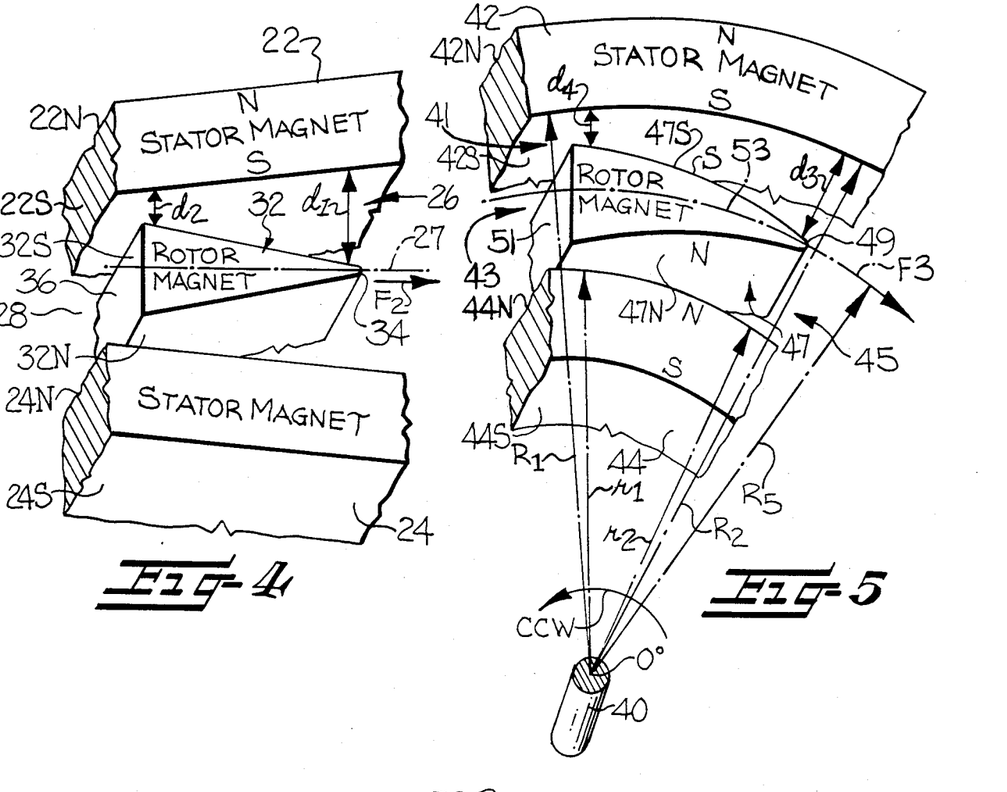
FIGS. 4 and 5 are perspective, partial views of two generally planar and parallel stator magnets. The stator magnets are slightly inclined with respect to one another and are oriented with opposite polarity poles facing each other. A rotor magnet is disposed for movement therebetween.

FIG. 4 illustrates a permanent magnet motor that induces linear motion. Its configuration is similar to that of FIG. 3. The stator comprises a pair of slightly inclined generally parallel permanent magnets 22, 24. Each is a rectangular prism having a predetermined length, and they are maintained in a fixed spaced relationship that defines a gap 26 therebetween and a longitudinal axis 27. The gap has a narrower entrance section 28 and a wider exit section 30 at opposite ends thereof, as defined by the opposing interior faces 22S, 24N of the stator magnets. Each stator magnet has its north and south poles N and S on the larger faces 22N, 22S, 24N, 24S thereof, and the opposite polarity poles 22S, 24N face each other across the gap 26.

The rotor or center magnet 32 is a triangular prism disposed within the gap 26. It has a narrower circumferential end 34 closer to the gap exit section 30 and a wider circumferential end 36 closer to the gap entrance section 28. The two non-parallel rectangular faces are opposite magnetic poles 32N, 32S, and are in repulsion with respect to stator magnet faces 24N and 22S, respectively. The triangular cross sectional configuration of the rotor magnet increases the difference in distances from the rotor magnet to the stator magnets as measured at the opposite ends 34, 36 of the rotor magnet. Since $d_1$ is greater than $d_2$ the differences in repulsive forces results in a net force $F_2$ urging the rotor magnet to accelerate along the longitudinal axis 27 towards the gap exit section 30. One may substitute a rotor magnet that is a rectangular prism as illustrated in FIG. 3 for the triangular prism 32, illustrated in FIG. 4. This would reduce the difference between the distances $d_1$ and $d_2$, resulting in a reduction of the net force $F_2$; however, the difference between the distances resulting from the inclined stator magnets would still urge the rotor magnet to accelerate along the longitudinal axis 27. It is a matter of choice as to whether the stator magnets are inclined, the rotor magnet has a triangular cross section, or both are utilized.

FIG. 5 illustrates a permanent magnet motor similar to that in FIGS. 3 and 4, and it induces rotational motion around an axis of rotation 40. The stator comprises a pair of permanent magnets 42, 44 in a generally parallel, locally inclined, fixed spaced relationship. Each is a rectangular prism that is bent to form a general C-shape. The radii for each stator magnet 42, 44 either increase or decrease, respectively, as measured from the axis of rotation to the surface or face of each magnet, to form a segment of a spiral. Each stator magnet encompasses no more than 360°, and together the two define a generally C-shaped gap 41 therebetween. The gap has a narrow entrance section 43 and a wider exit section 45 at the opposite end thereof. Each stator magnet has its north and south poles N and S on the longer faces 42N, 42S, 44N, 44S thereof. The opposite polarity poles face each other across the gap 41 to create a generally uniform magnetic field therebetween.

Referring to the inner stator magnet 44, the radial distance r from the axis of rotation 40 to the gap face 44N increases as the arc degree position advances counterclockwise (CCW) from a zero degree position as shown in FIG. 5. Thus, $r_1$ is greater than $r_2$. Referring to the outer stator magnet 44, the radial distance R from the axis of rotation 40 to the gap face 42S decreases as the arc degree position advances counterclockwise from a zero degree position. Thus, $R_1$ is less than $R_2$. The range of radii r for the inner stator magnet 44 is less than the range of radii R for the outer stator magnet 42.

The center or rotor magnet 47 is a curved, generally triangular prism disposed within the gap 41. It has a narrower circumferential end or tip 49 closer to the gap wide end or exit section 45 and a wider circumferential end 51 closer to the gap narrow end or entrance section 43. The two curved faces are opposite magnetic poles 47S, 47N, and are in repulsion with respect to the curved stator magnet faces 42S and 44N, respectively, defining the gap 41. A curved central axis 53 bisects the rotor magnet and extends from the narrower end 49 to the midpoint of the wider end or base 51.

The rotor magnet is operatively attached to a rotor means by conventional methods for rotation around the axis of rotation 40 at a predetermined constant radius $R_5$. It is preferred that the curved central axis 53 of the rotor magnet have a radius of curvature equal to $R_5$, that the circle defined by the radius $R_5$ be equidistant at any selected arc degree position from the stator magnet faces 42S, 44N defining the gap 41, and that the central axis 53 of the rotor magnet coincide with the circle defined by the radius $R_5$.

The radial distance between the faces of the rotor magnet 47S, 47N and the respective faces of the stator magnets 42S, 44N increase as one moves clockwise around the axis 40 from the narrower end 49 of the rotor magnet to the wider end 45, regardless of the arc degree position of the rotor magnet, provided that the rotor magnet is entirely within the stator gap 41. Specifically, at the narrower end of the rotor magnet the radial distance from the rotor magnet face 47S to the stator magnet face 42S is illustrated as $d_3$. At the wider end of the rotor magnet the corresponding radial distance is illustrated as $d_4$, which is less than $d_3$. Because $d_4$ is less than $d_3$ the difference in repulsive forces results in a net force $F_3$ urging the rotor magnet to accelerate along the arc described by the radius $R_5$ toward the gap exit section. While the invention has been described referring to repulsive magnetic forces, it is understood that attractive forces, or a combination of the attractive and repulsive forces may be utilized.

Figure 6:
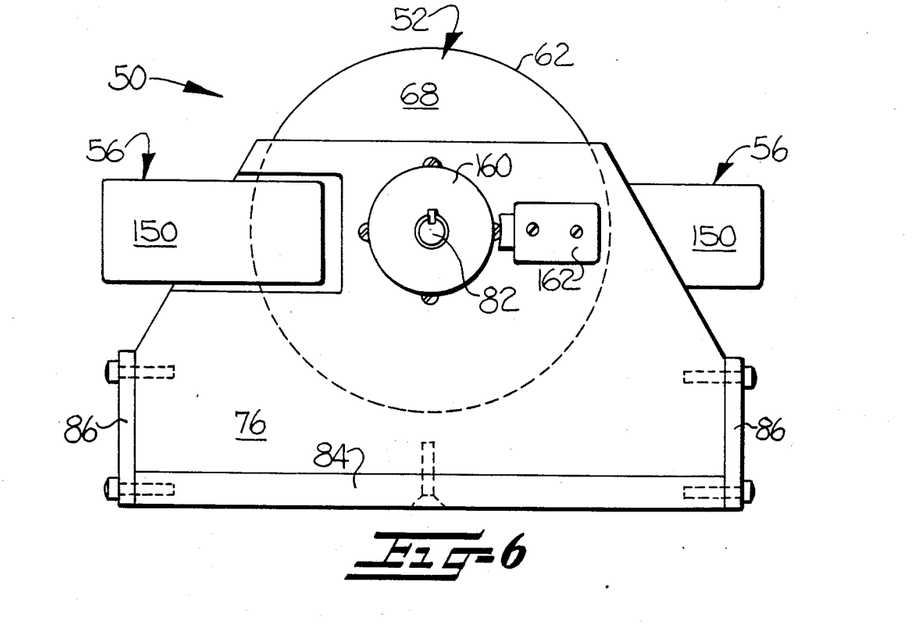
FIG. 6 is an end elevation view of one embodiment of the present invention.
Figure 7:
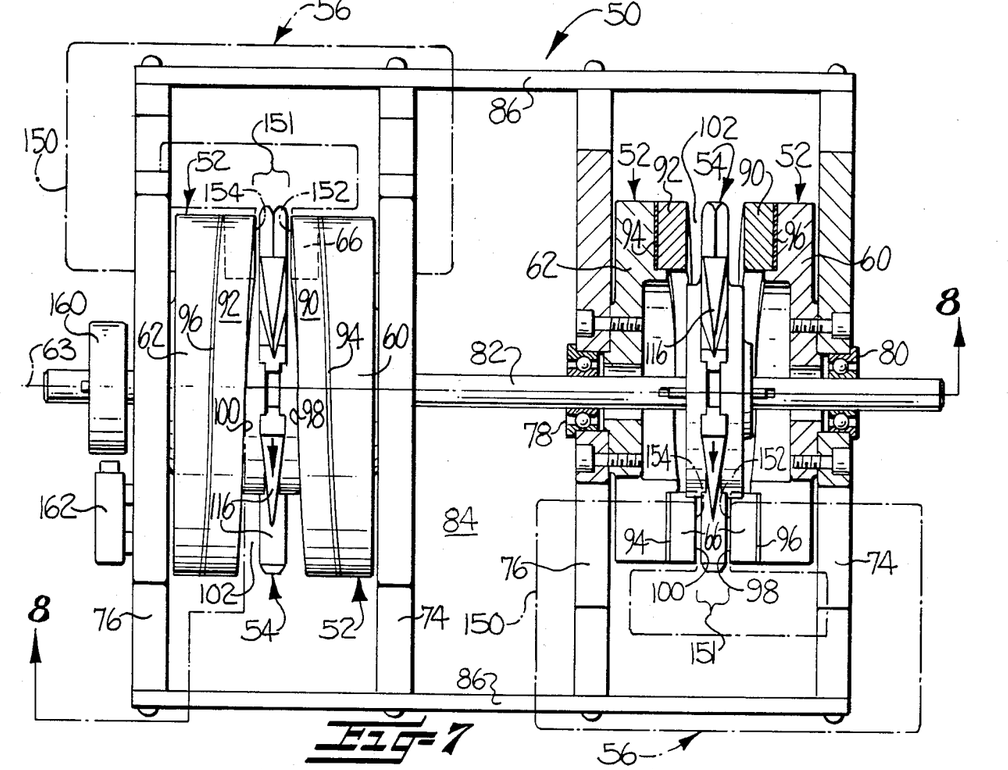
FIG. 7 is a combination plan and sectional plan view of the present invention.
Figure 8:
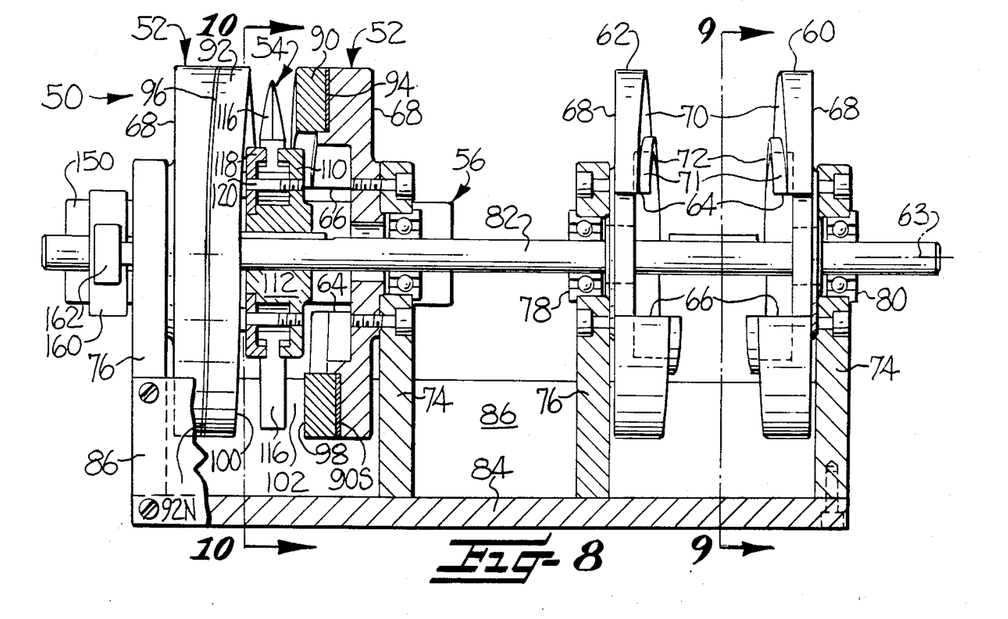
FIG. 8 is a partial elevation and longitudinal section view of the present invention taken along the lines 8—8 of FIG. 7 with the right half stator portion shown in elevation and selected items deleted for clarity.

Referring to FIGS. 6, 7 and 8, one of the preferred embodiments shall be described using like numbers to designate like items. The invention is illustrated as having two stator-rotor units on a single common shaft. It should be understood that one or more stator-rotor units may be utilized, as necessary or desirable, and the number of rotor magnets may vary as necessary or desirable. When a multiplicity of stator-rotor units are paired, their stators may be 180° out of phase, as illustrated in FIGS. 6 and 7. This provides space for the electromagnets and minimizes torque impulses to smooth the combined rotational output at the shaft.

The permanent magnet motor 50 comprises three basic parts. The stator means 52 includes at least a pair of opposed permanent magnets that define a gap therebetween. The rotor means 54 includes a predetermined number of permanent magnets disposed for rotation in said gap. The electronic control means 56 includes an electromagnet that induces an electromagnetic field that interacts with the magnetic fields of the rotor and stator to control rotation of the rotor.

Figures 9, 10, 11:
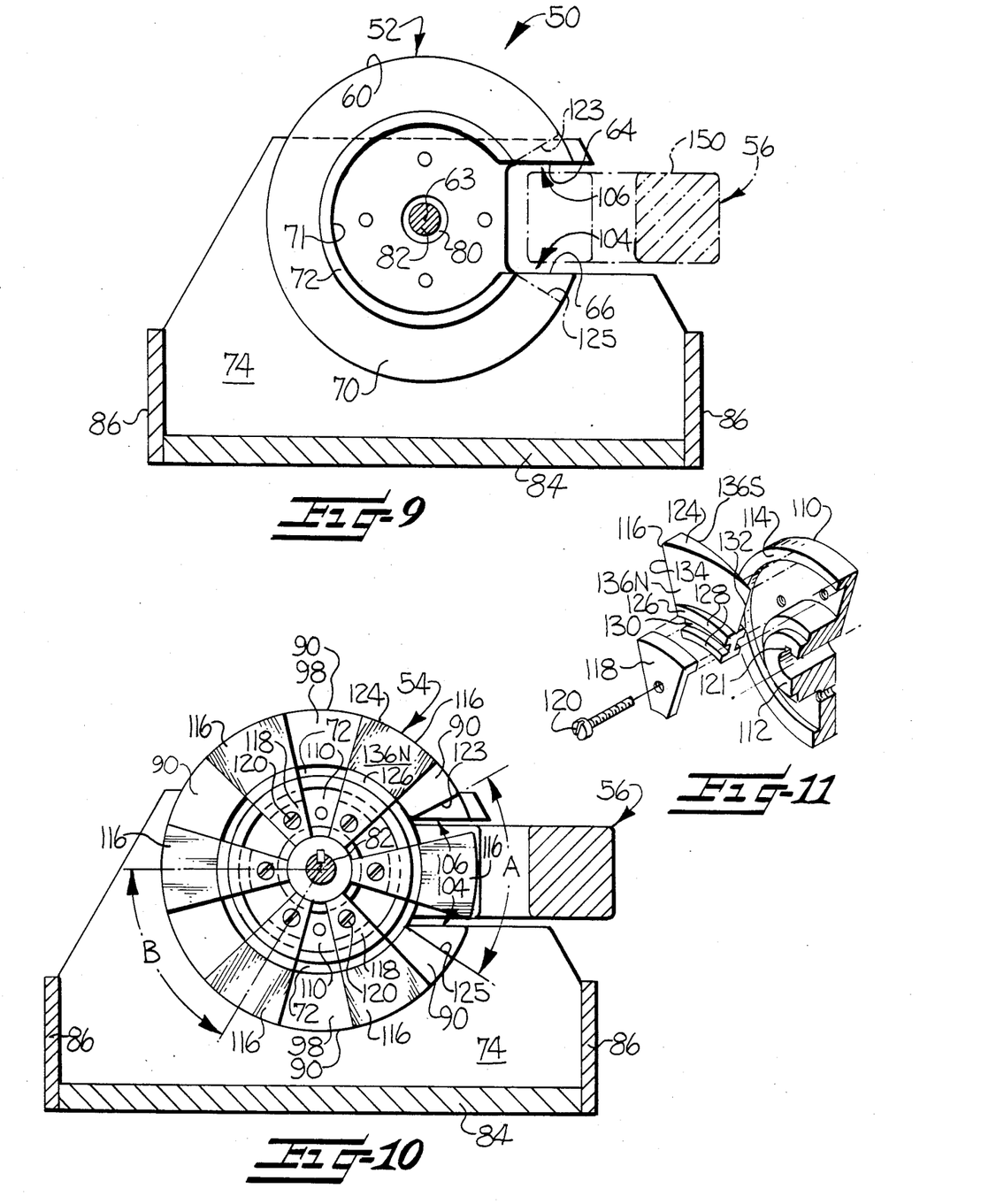
FIG. 9 is a transverse sectional view taken along lines 9—9 of FIG. 8.
FIG. 10 is a transverse sectional view taken along lines 10—10 of FIG. 8.
FIG. 11 is an exploded perspective view of a rotor permanent magnet and its mounting means for the present invention.

Referring primarily to FIGS. 8 and 9, the stator 52 includes a pair of opposed magnet keepers 60, 62 made of non-ferrous material. Each magnet keeper has a C-shaped configuration, with first and second ends 64, 66. The C-shape also defines a central longitudinal axis 63, that is coincident for the two magnet keepers. The outer stator surface 68 may be planar or any other suitable shape. The inner stator surface 70 forms a segment of a helix wherein the first and second ends 64, 66 are axially displaced a predetermined distance from one another. This shape is similar to that of a common split lockwasher. An annular ledge 72 protrudes axially outward from the inner stator surface 70 along the inner periphery 71 thereof, forming a shelf upon which to rest the stator magnets. The magnet keeper may be attached to a non-ferrous upstanding frame member 74 in a convenient manner, such as with screws 76, to maintain axial alignment and position.

The second or opposing magnet keeper 62 is a mirror image of a magnet keeper 60; thus, it is axisymmetrical with respect to a plane perpendicular to the longitudinal axis 63 that is located midway between the two magnet keepers. The location of such a plane is coincident with the cross sectional viewing line 9—9 of FIG. 8. Magnet keeper 62 may be attached to a non-ferrous frame member 76 in the same manner as magnet keeper 60. The frame members may house a pair of coaxial, spaced bearing means 78, 80 to rotatably support a shaft 82 coincident with the longitudinal axis 63. The frame members may be attached to a non-ferrous base 84 as necessary or desirable, and may include side supports 86.

A pair of C-shaped permanent magnets 90, 92 configured to match the helical inner surfaces 70 of the magnet keepers 60, 62, are attached thereto. The magnets are of uniform axial thickness and are magnetized through the axial thickness with opposite poles facing each other across the gap therebetween. Similarly C-shaped members 94, 96 of highly permeable magnetic material may be sandwiched between each stator magnet 90, 92 and its respective magnet keeper 60, 62 to form a part of the magnetic flux path. In addition, highly permeable magnetic material may be used at other locations to assist in shaping the magnetic field by absorbing magnetic flux to enhance the desired operating characteristics. For instance, it may connect the outer pole faces 90N, 92S to bridge the air gap and reduce the resistance of the magnetic circuit therebetween.

The inner opposing faces 98, 100 of the stator magnets 90, 92 define a curved, C-shaped gap 102 having an entrance section 104 (FIG. 9) adjacent magnet keeper end 66, and an exit section 106 adjacent magnet keeper end 64. The gap has a gradually increasing width of uniform gradient measured axially between the opposing stator magnet faces 98, 100 as one moves around the gap from entrance to exit. While the magnet keepers have been described as having a non-uniform axial thickness to provide a helical shape, and the magnets have been described as having a uniform thickness, it is to be understood that these dimensions may vary provided that the gap, for this embodiment, has an axial face to face distance that increases from entrance to exit. Note, however, that this same design principal includes a gap with a constant axial face to face distance and a rotor magnet with a triangular cross section.

Referring to FIGS. 10 and 11, a rotor 54 is mounted for rotation on the shaft 82 coaxial with the longitudinal axis 63. The rotor includes a non-ferrous circular plate 110 with a central hub 112 and an annular raised lip 114 at the periphery. A predetermined number of permanent magnets 116 are disposed radially outwardly at equally spaced arc degree intervals. Six rotor magnets are shown, but the number may vary. A plurality of non-ferrous locking caps 118 coact with the rotor hub 112 and the peripherally located lip 114 to releasably clamp a portion of a rotor magnet therebetween. A screw or other fastener 120 is suitable. The rotor hub may include an axial slot 121 to accept a key connected to the shaft 82.

Referring to FIG. 10, the stator magnet 90 is shown behind the rotor magnets 116, and surrounds approximately 300 arc degrees of the longitudinal axis 63 for a rotor having six magnets. The included arc-degree angle A measured between the ends 123, 125 of the stator magnet should be approximately equal to the arc-degree angle B between the centers of adjacent rotor magnets, as measured in a plane perpendicular to the longitudinal axis. For instance, if there were ten rotor magnets, the angle A would be 36°.

Referring to FIG. 11, each rotor magnet has an upper portion 124 shaped as a curved, generally triangular prism and a lower portion 126 shaped as a curved, generally rectangular prism. The lower portion may include protruding bosses 128 or it may define notches 130 as desirable to complement and interlock with the lip 114 on the rotor hub 112. The upper portion of the rotor magnet has a narrow tip end 132, a wider tail end 134, and planar, generally rectangular side faces 136S, 136N that are inclined towards one another. The rotor magnet is magnetized through its thickness with the north and south poles occupying each respective face. When clamped in position on the rotor hub the rotor magnets are oriented to be in repulsion with respect to the stator magnet faces defining the gap 102, and the tip end 132 leads rotation, entering the gap entrance section before the tail end 134. As an alternative, the rotor magnet may be magnetized in the opposite polarity to utilize attractive, rather than repulsive, forces.

Referring to FIGS. 6, 7 and 8, the electronic control means 56 includes a C-shaped electromagnet 150 having opposing poles 152, 154 that define an air gap 151 therebetween. The electromagnetic poles 152, 154 are disposed between the first and second ends 64, 66 of the C-shaped stator magnets so that they are on opposite sides of the rotor magnets. The air gap has an axial thickness with respect to the longitudinal axis 63 that approximates the axial thickness of the gap entrance section 104. Preferably, there is one electromagnet for each rotor-stator set, and the opening defined by the stator magnets together with the associated electromagnets for each set are 180° apart to limit interaction between each other or from induced currents, and to smooth the motor's rotation. A more detailed description of the electromagnets, their associated circuitry, and their operation is provided later herein.

A tachometer means 160 causes an electrical circuit means 162 to generate an electrical output signal in response to the rotational speed and angular position of the shaft 82. The output signal is transmitted and processed by electronic means to control the electromagnet 150, causing it to induce or collapse a magnetic field between opposing poles 152, 154. The energy to operate the electromagnet may be provided by conventional sources.

FIGS. 12, 13, 13A and 13B disclose an alternate embodiment of the present invention. It relies upon the same principles disclosed earlier herein, but it utilizes a pair of opposed C-shaped stator magnets that are spiral shaped and nested one inside of the other, rather than being axisymmetrical mirror images of a portion of a helix. This embodiment generally includes a stator defining a longitudinal axis, a rotor mounted for rotation around said longitudinal axis, and an electronic control means.

Figure 13:
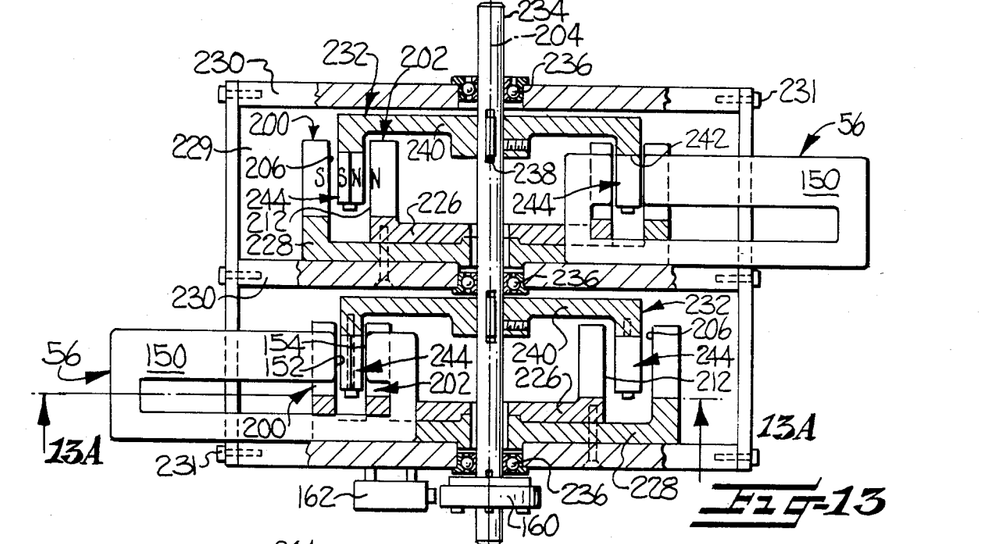
FIG. 13 is a schematic sectional plan view of a second embodiment of the present invention.

The stator comprises at least one pair of permanent magnets in a predetermined generally parallel fixed spaced relationship. The outer magnet 200 and the inner magnet 202 are separate magnets. Both are C-shaped, and each defines a common transverse axis 204. Both stator magnets are rectangular prisms bent along their length to form a segment of a spiral. Thus, the inner axial surface 206 of the outer stator magnet 200 has a radius $r_3$ that gradually increases as one increases the arc degree position clockwise (CW) around the transverse axis 204 as indicated from the entrance end 208 of the magnet to its exit end 210. The outer axial surface 212 of the inner stator magnet 202 has a radius $r_4$ that gradually decreases as one increases the arc degree position clockwise around the transverse axis 204 from the entrance end 214 of the magnet to its exit end 216. All radii are measured from the transverse axis 204, and the radius gradient may be uniform. The range of radial distances $r_4$ for the inner stator magnet 202 is less than the range of radial distances $r_3$ for the stator magnet 200.

The inner and outer stator magnets are coaxial and generally coplanar, yet slightly inclined, with the inner stator magnet 202 nested inside of the outer stator magnet 200. Together, the outer surface 212 of the inner stator magnet and the inner stator surface 206 of the outer stator magnet define a curved, C-shaped longitudinal gap 220 having generally parallel sides. The entrance ends 208, 214 of the stator magnets are aligned radially to define a narrower gap entrance section 222, and the exit ends 210, 216 of the stator magnets are aligned radially to define a wider gap exit section 224. The gap dimensions referred to are measured radially, and the radial face to face distance across the gap increases as one moves from entrance to exit.

Each stator magnet 200, 202 is magnetized through its radial thickness with opposite poles facing each other across the gap. For example, inner surface 206 is south (S) and outer surface 212 is north (N). Although all embodiments disclosed herein have opposite polarity poles facing each other across the gap, like poles could face each other across the gap if the rotor magnet were a sandwich construction with like poles on both outer surfaces.

Figure 12:
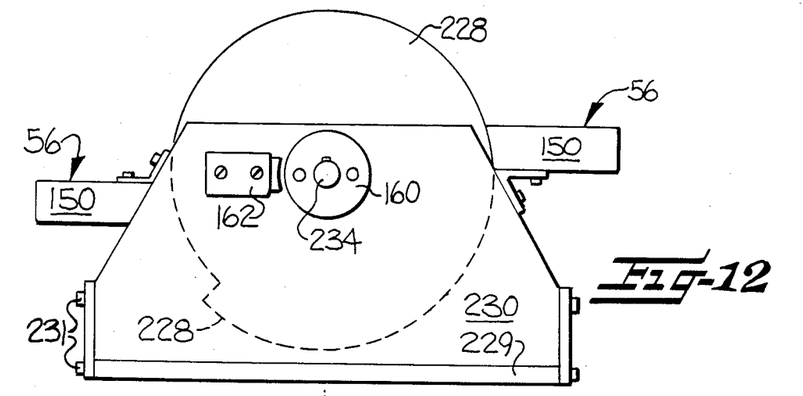
FIG. 12 is an end elevation of a second embodiment of the present invention.

The inner stator magnet keeper 226 and the outer stator magnet keeper 228 are made of non-ferrous material. Each may be configured and attached to non-ferrous base 229 or support plates 230 as necessary or desirable using conventional fasteners 231, provided that the stator magnets 200, 202 retain their predetermined spaced relationship. As noted before, highly permeable magnetic material may be used to assist in shaping the magnetic field.

The rotor 232 is mounted on a shaft 234 that is coincident with the longitudinal axis 204 of the stator. The shaft is suitably journaled for rotation in bearings 236 mounted in the support plates 230 or the like. The rotor may be secured against rotational slippage with respect to the shaft by a key 238 or splines (not shown).

The rotor itself is cup-shaped, comprising a disk like magnet keeper 240 and an axially extending boss 242 at the periphery thereof. The disk is coaxial with and perpendicular to the shaft 234 and longitudinal axis 204. The rotor permanent magnets 244 are attached to the boss 242 at predetermined spaced intervals and are axially disposed for rotation at a mixed radius in the gap 220 between the opposing stator magnets 200, 202.

The rotor magnets 244 are curved, generally triangular prisms, as described earlier in connection with FIG. 5. Each has a narrow circumferential end or tip 246 and wider circumferential end or base 248. The two curved faces define opposite polarity magnetic poles 250N, 250S that are in repulsion with respect to the stator magnet faces 206, 212. A curved central axis 252 bisects the curved rotor magnet faces and lies at a fixed radius $R_3$ from the transverse axis 204 at all angular positions. The fixed radius $R_3$ also defines the center of the gap 220. The tip 246 of the rotor magnet is oriented to enter the gap entrance section 222, followed by the base 248, as the rotor turns. As with the magnet keepers 226 for the stators, the rotor 232 is made of non-ferrous material and its configuration may be amended as necessary or desirable provided that the rotor magnets maintain their position and orientation within the gap 220. As noted in connection with FIGS. 4 and 5, rectangular rotor magnets may be substituted for the illustrated triangular magnets.

The electronic control means 56, including the electromagnet 150, tachometer 160 and electrical circuit 162, are identical to that described earlier in connection with FIGS. 6, 7 and 8, except that the electromagnetic poles 152, 154 are disposed radially rather than axially. Accordingly, those components in FIGS. 12 and 13 are identified with the same numbers as the like components in FIGS. 6, 7 and 8.

Figure 14:
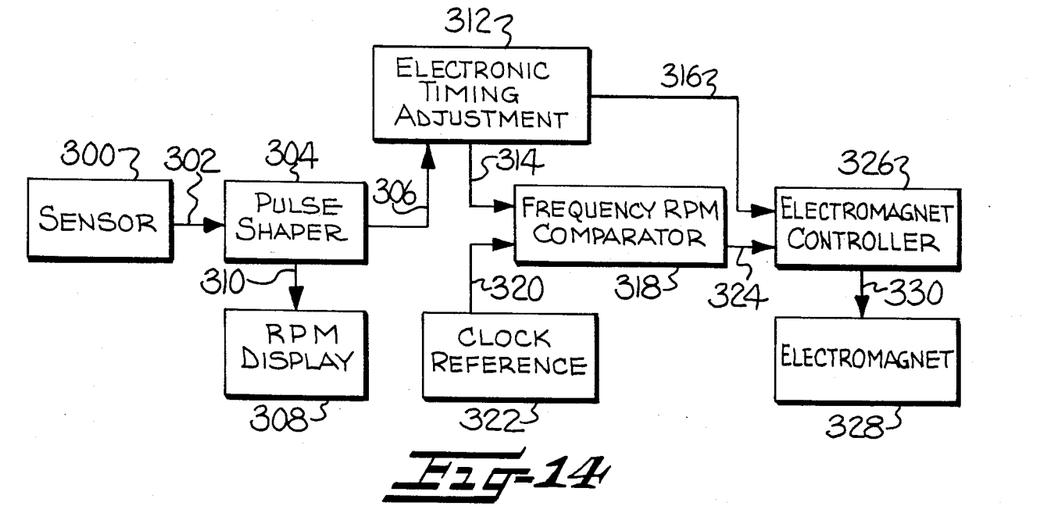
FIG. 14 is a block diagram of the electronic control means of the present invention.

Referring now to FIG. 14, a sensor 300, which may be the equivalent of the electrical circuit 162 in FIGS. 7 and 13, generates an output pulse on line 302 in response to the rotational speed and position of the shaft 82. The output pulse on line 302 is transmitted to a pulse shaper 304 to provide output pulses of uniform voltage and duration on line 306. Although the pulse shaper 304 is not essential to the circuit, it enhances the stability and uniformity of operation. An RPM display 308 may be connected to the pulse shaper 304 in a known manner, as by line 310, to provide a direct readout of the motor's rotational speed, if desired. The output of the pulse shaper is provided by line 306 to the electronic timing adjustment 312, which may delay in time the output of the pulse shaper 304. Such a delay may also be accomplished mechanically by altering the position of the sensor 300. The time adjusted signal output appears on lines 314, 316. The frequency RPM comparator compares the differences between the signal on line 320 from the clock reference 322 and the signal on line 314 from the electronic timing adjustment, and it produces a proportional output on line 324 that represents an error signal. The electromagnet controller 326 applies an electrical pulse of predetermined magnitude and time delay to the electromagnet 328 via line 330 in response to the input from the frequency RPM comparator 318 and electronic timing adjustment 312. By balancing the resistive, capacitive, and inductive values in the electromagnet controller circuit of FIG. 16, synchronous operation is possible. The electromagnet will first attract the rotor magnet as it approaches the center of the electromagnet air gap and then reverse the polarity of its magnetic field to repel the rotor magnet as it leaves the center of the electromagnet air gap.

The sensor 300 may be one of many types which provide an output signal, preferably digital, in response to the rotational speed of the rotor. It may detect rotor speed in any conventional manner, for instance, by the use of a magnetic sensor (Microswitch type 4AVIIA), an electromagnetic eddy current sensor (Microswitch type FYFA2N6-2), an optical infrared sensor, or a mechanical linkage sensor. For the present invention, six pulses are produced for each 360° rotation, i.e. one pulse for each rotor magnet.

The pulse shaper 304 provides an output pulse of uniform voltage and period, in response to an input pulse from the sensor 304, that meets predetermined threshold specifications for the electronic timing adjustment 312. The shape of the output pulse on line 306 is independent of the shape of the input pulse on line 302. An LM555 integrated circuit is suitable, and its design and use is well known.

The RPM display 308 may be any suitable or compatible frequency display. Examples include Heathkit model IM-2410 and ICM 7226 from Intersil coupled to an LED display.

Figure 15:
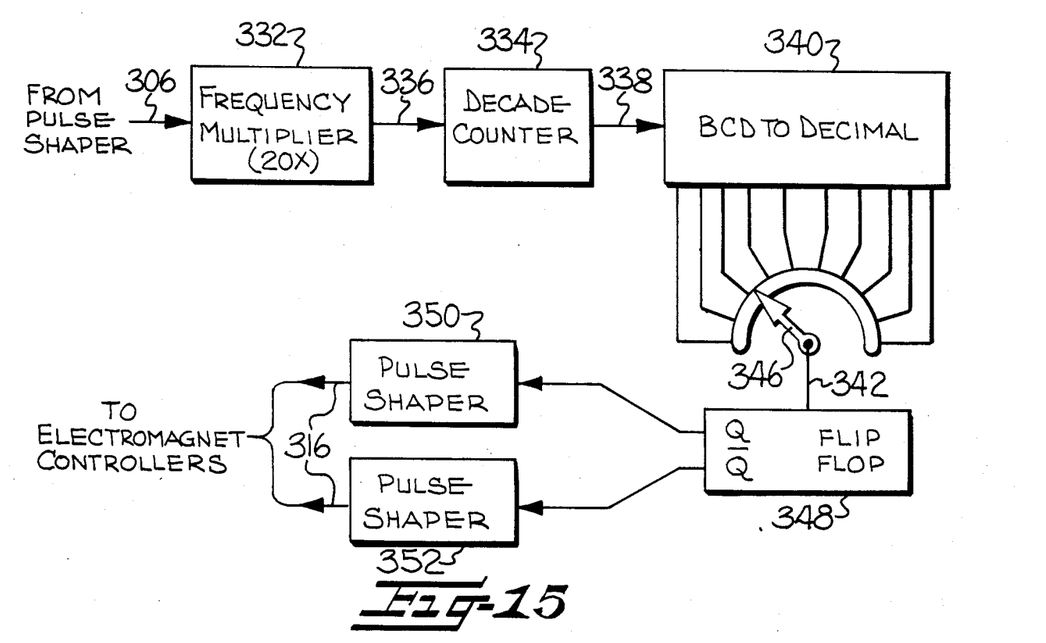
FIG. 15 is a block and schematic diagram of the electronic timing adjustment circuit portion shown in FIG. 14.

The electronic timing adjustment 312 permits selective time-based variation of the application of electrical energy to the electromagnet 328. Referring to FIG. 15, the signal on line 306 from the pulse shaper 304 is multiplied, for example, twenty times by the frequency multiplier 332 and supplied to the decade counter 334 via line 336. The multiplier may be an SN7493 integrated circuit. The decade counter provides on line 338 twenty binary coded counts for each pulse from the pulse shaper 304. The binary coded decimal (BCD) to decimal decoder 340 converts the binary coded count to a pair of ten unit or decimal counts. The first decimal count governs the electromagnet for a first rotor and the second decimal count governs the electromagnet for a second rotor, the electromagnets being one half cycle or 180° out of phase as illustrated in the dual rotor motors of FIGS. 7, 8, 12 and 13. Thus, one may delay energization of the electromagnets from zero to fifty percent by adjusting contact arm 346. The BCD to decimal decoder 340 may be an SN7442 integrated circuit. The output on line 342 is provided to a flip flop 348 which alternates the output of the electronic timing adjustment between the two electromagnet controllers via pulse shapers 350, 352. A suitable substitute for the SN7293 includes a phase locked loop integrated circuit, such as LM 565 CN, interrupted by a divide by twenty integrated circuit, such as SN 7490. Still another means of frequency multiplication is the use of a frequency to voltage convertor 9400 CJ, a times-twenty amplifier LM 324 and then another 9400 CJ used as a voltage to frequency convertor.

The output from the electronic timing adjustment 312 is compared to the output from a clock reference 322 by a frequency-RPM comparator 318, such as a differential amplifier LM 741. The inputs on lines 314 and 320 result in an output signal on line 324 that is proportional to the difference between the actual rotor speed and the desired rotor speed.

The output from the frequency-RPM comparator 318 is supplied to the electromagnet controller 326 via line 324, as is the output from the electronic timing adjustment 312. The controller applies energy to the electromagnet 328 and controls the effect of the electromagnetic field by varying the timing of the electrical energy applied to the electromagnet, with respect to the angular position of the rotor magnets, and by varying the amplitude of the electrical energy pulse that generates the electromagnetic field.

Figure 16:
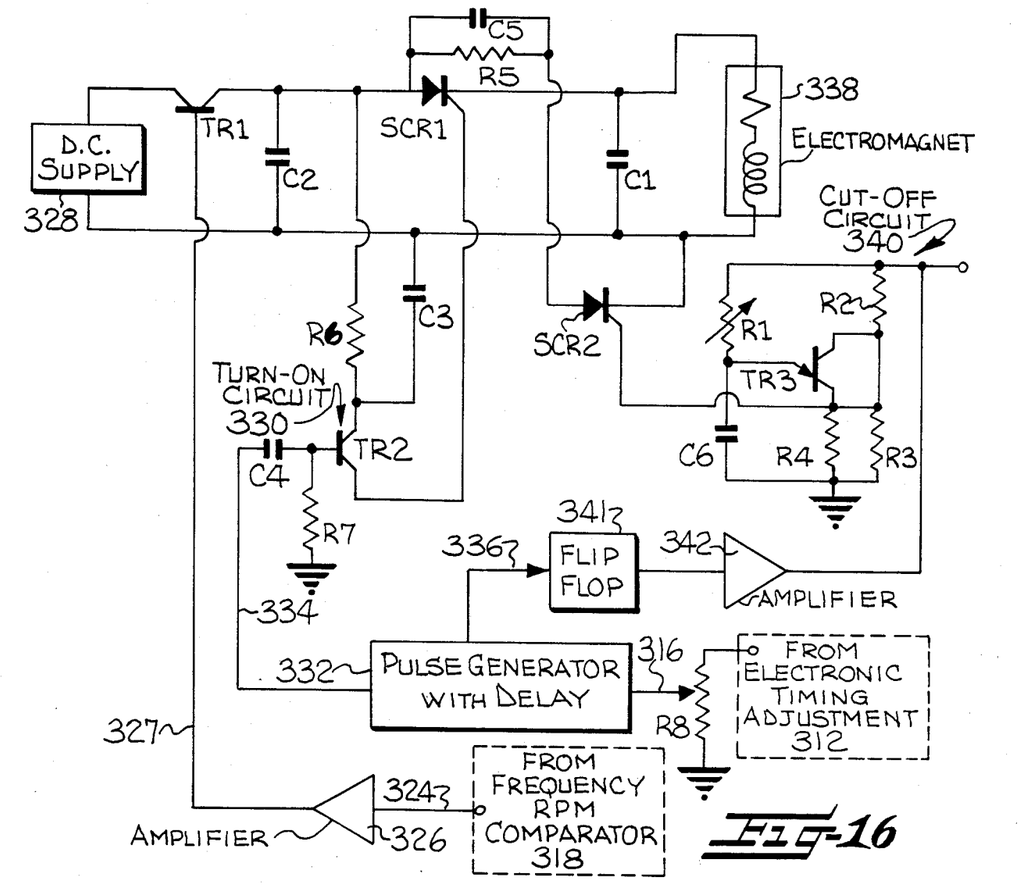
FIG. 16 is a block and schematic diagram of the electromagnet and electromagnetic controller shown in FIG. 14.

Referring to FIG. 16, the input on line 324 is applied to amplifier 326, such as an LM 741. The output of the amplifier 326 is applied via line 327 to the base of transistor $TR_1$, which is in series with a DC supply 328 and an energy storage capacitor $C_2$. Together they comprise a voltage regulator. Any suitable voltage regulating circuit may be utilized. Discharge of capacitor $C_2$ is selectively blocked by silicon controlled rectifiers $SCR_1$ and $SCR_2$. $SCR_1$ is normally off or non-conductive permitting $C_2$ to charge. It switches to its conductive state in response to a signal from the turn-on circuit 330.

The signal from the electronic timing adjustment 312 is applied to a pulse generator 332 with a voltage controlled time delay through a variable resistor $R_8$. After a threshold voltage is reached across resistor $R_8$, which triggers the preselected time delay in the pulse generator 332, a pulse output is supplied on lines 334, 336. Thus, the firing circuit has two sources of time delay—the manual biasing adjustment of resistor $R_8$ and the automatic instantaneous adjustment from frequency-RPM comparator 318. An LM 122 integrated circuit is a suitable pulse generator. The pulse output on line 334 is applied to the base of transistor $TR_2$, such as a 2N2222, causing it to conduct and supply a sufficient turn-on voltage to the gate of $SCR_1$, triggering it into the on or conducting state. Elements $C_3$, $C_4$, $R_6$, and $R_7$ bias transistor $TR_2$ or filter signals.

Charged capacitor $C_2$ discharges through $SCR_1$ and energizes the balanced resistive, capacitive, inductive circuit represented by the capacitor $C_1$ and the electromagnet 338 to create an electromagnetic field across the poles of the electromagnet, which are disposed on opposite sides of the rotor (see FIGS. 7 and 13) and attract (or repel) a rotor magnet. After the electromagnetic field peaks, it collapses and charges capacitor $C_1$, connected across the terminals of the electromagnet, to reverse the electromagnetic field. This repels (or attracts) the rotor magnet in synchronization with its rotational movement to urge it into the gap between the stator magnets. The timing circuitry determines when the electromagnet is energized, which in turn determines whether the electromagnet will initially repel or attract the rotor permanent magnets.

$SCR_1$ is turned off or rendered non-conducting by the cut-off circuit 340. The delayed output from pulse generator 332 on line 336 sets or resets flip-flop 341, the output of which is passed through amplifier 342 to the cutoff circuit 340. A predetermined time constant is set by adjustment of variable resistor $R_1$ and capacitor $C_6$, each placed across a different emitter-base junction of the unijunction transistor TR$_3$ in conventional fashion. When the time constant has been reached the unijunction transistor TR$_3$ conducts to fire SCR$_2$, which grounds capacitor C$_5$, drives the voltage across SCR$_1$ to zero, and thereby causes it to turn off. Resistors R$_2$, R$_3$ and R$_4$ bias transistor TR$_3$.

A number of variations are possible in the design of a suitable electronic control circuit. Adjustment of the time constants for the pulse generator 332 and the cutoff circuit 340, and the balancing of the RCL circuit for the electromagnet 338 depend upon the desired operational characteristics of the magnetic motor. The electromagnet is U or C shaped, as desired. In addition, one may elect to use analog or digital circuitry, a combination of both, or a microprocessor, as desired.

Figure 17:
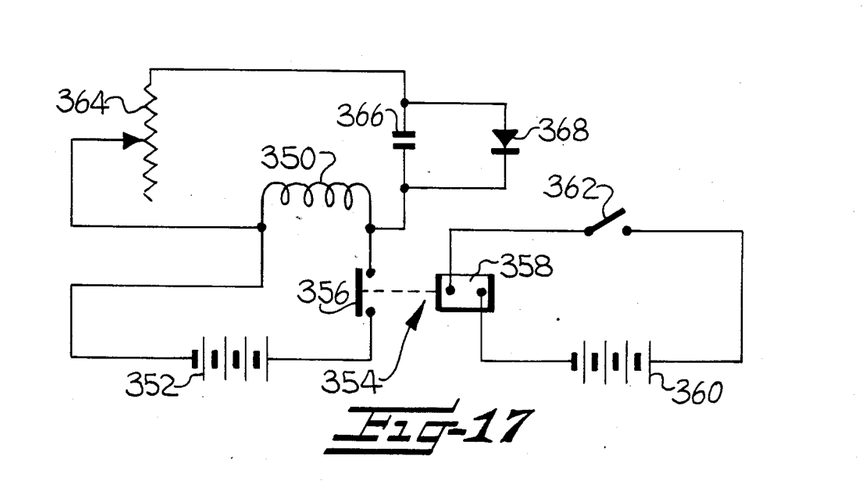
FIG. 17 is a schematic diagram of an alternate embodiment of the electromagnet and electromagnet controller.

FIG. 17 illustrates an alternate embodiment of the electromagnet and electromagnet controller circuit. The electromagnet 350 is electrically connected to a direct current voltage source 352 through a normally open relay 354 which, when energized, closes switch 356. The relay is energized by an electrically isolated circuit comprising an electromagnetic coil 358, a direct current voltage source 360, and a sensor switch 362. The sensor switch may be cam operated and placed in a location similar to that illustrated for the electrical circuit 162 in FIGS. 7 and 13. Resistor 364, capacitor 366, and diode 368 balance the operation of the electromagnet 350.

Figure 13A:
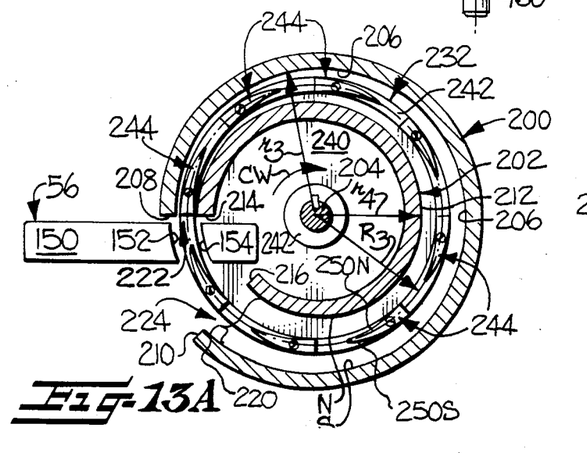
FIG. 13A is a transverse sectional view taken along lines 13A—13A of FIG. 13 showing the rotor and associated stator magnets.
Figure 13B:
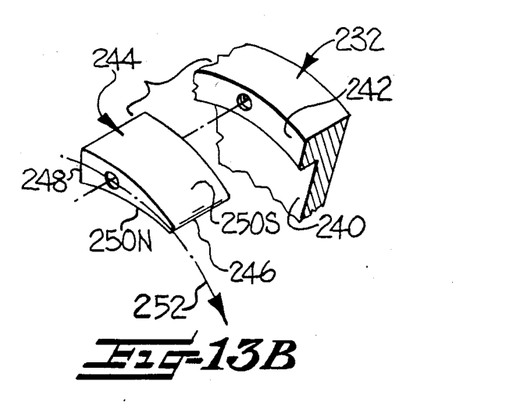
FIG. 13B is an exploded perspective of a rotor permanent magnet of the second embodiment of the present invention.

The operation of the permanent magnet motor is described with reference to FIGS. 8 and 13A, starting with a rotor magnet completely inserted into the gap entrance section 222 as shown in FIG. 13A. The radial distance from the face of the rotor magnet to the face of the stator magnet is greater at the tip of the rotor magnet than at the tail of the rotor magnet. Since the repulsive forces generated by the opposing rotor-stator magnetic fields are generally inversely proportional to distance (Coulomb's Law), a net force is created urging the rotor magnet in the direction of its tip and the ever widening gap. Each rotor magnet in the gap contributes to the force urging rotation of the rotor, and the rotor magnets are propelled from the gap entrance section to the gap exit section.

As the rotor magnet leaves the gap exit section and continues towards the entrance section, it encounters the repulsion of the magnetic field of the entrance section. If the rotational force generated by the magnets disposed within the gap is sufficient to overcome the repulsive forces hindering the entrance of the rotor magnet into the gap, rotation will continue. If the rotational force generated by the magnets disposed within the gap is not sufficient, the electromagnetic means may be utilized to create a magnetic field to urge the rotor magnet into the entrance section of the gap. In a timed rotational sequence as determined by the tachometer, the electrical circuit induces a magnetic field to attract a rotor magnet as it leaves the gap exit section. Preferably, the preceding rotor magnet will be substantially within the gap entrance section so that the retarding effect of the electromagnetic field upon it will be negligible. As the attracted rotor magnet nears the middle of the gap between the electromagnet poles, the attractive field collapses and is reversed to repel the rotor magnet, urging it into the gap entrance section. This timed field reversal thus has a pull-push effect to enhance rotation of the rotor.

In addition, the repulsive force of an entering rotor magnet may be counterbalanced by the forward thrust of an exiting rotor magnet, thus reducing the negative thrust experienced by the entering magnet. This improves output torque and smoothes variations in torque.

In a similar fashion the electromagnetic means may be utilized to retard rotation or slow the rotational speed by varying the electromagnetic field strength or by reversing the field polarities. The speed or energy output of the permanent magnet motor may also be controlled by changing the face to face distance between the stator magnets. The closer they are to the face of the rotor magnets, the greater the magnetic forces between them, and the greater the energy output. On the other hand, the motor may be stopped by separating the stator halves.

In the alternative, the motor could operate utilizing attraction forces by reversing the polarity of the rotor magnet and the polarity of the electromagnetic means. A further alternative is to use an independent energy source to turn the rotor and use the apparatus as a generator. Movement of a magnet between the poles of the electromagnet will induce an electrical current therein, and additional coils may be placed around the periphery of the stator by, for example, connecting the outer surfaces of the stator magnets 92N and 90S (FIG. 8) with permeable magnetic material surrounded by an electrical coil.

The motor of this invention is not limited by size or configuration except as stated. However, to assist others in practicing the invention, the following specifications are set forth, although they may be changed as necessary or desirable.

Thickness of stator magnets: 0.5 inches.
Thickness of rotor magnets:
  Disc rotor: 0.5 inches
  Cup-shaped rotor: 0.5 inches tapering to 0.06 inches.
Width of gap inlet section: 0.51 inches.
Width of gap outlet section: 0.70 inches.
Stator circumference: 18 inches.
Rate of change of gap per inch of circumference: 0.008 to 0.015 inches.
Number of rotor magnets: 6
Magnets: Rare earth cobalt As with the alternate embodiments disclosed herein, it is apparent that this invention is capable of various modifications in the shapes of the stator and rotor, their orientation with respect to each other or a common axis, and the shapes and orientations of the stator and rotor magnets. It is also apparent that different designs of the basic motor unit may be combined on a common shaft or nested within one another. Further modifications may be made in the materials used, magnetic or otherwise, to enhance operation or reliability, or to reduce costs. For instance, one may improve efficiency by cooling the magnets. This increases the magnetic field by reducing thermal activity which otherwise degrades internal coherence. Such an improvement may result in sizeable increases in output because the forces generated are proportional to the square of the field strength. Accordingly, while the invention has been described with reference to specific configurations, it is to be understood that this disclosure is to be interpreted in its broadest sense and encompass the use of equivalent apparatus and mechanisms.

What is claimed is:

1. An electromagnetic rotary motor comprising:
   (a) stator means including stator magnet means having opposing pole faces defining a gap therebetween with a generally uniform magnetic flux density thereacross, said gap having an entrance section, an exit section and a generally curved longitudinal path extending from said entrance section to said exit section around a transverse axis, the magnetic flux density changing from said entrance section to said exit section as a function of arc degree position around said transverse axis;

(b) rotor means mounted for rotation around an axis generally coincident with said transverse axis, said rotor including a predetermined number of rotor magnets disposed radially outwardly from said transverse axis and substantially within said gap, each pole of each rotor magnet being spaced from said stator pole face and aligned in a predetermined orientation with respect thereto, the magnetic field of each of said rotor magnets interacting with the magnetic field of said stator magnet means; and (c) electronic control means for inducing an electromagnetic field from an external source of energy, said means for inducing an electromagnetic field being responsive to the relative rotational position of said rotor for successively interacting with the magnetic field of each of said rotor magnets to urge each of said rotor magnets towards the entrance section of the gap, whereby the magnetic field of each rotor magnet interacts with the magnetic field of said stator means and said means for inducing an electromagnetic field creating forces that urge said rotor magnets along the longitudinal path of said stator gap, causing the rotor to rotate around said transverse axis.

2. An electromagnetic rotary motor comprising:

(a) stator means including stator magnet means, the pole faces thereof in a predetermined generally parallel fixed spaced relationship defining a gap therebetween with opposite polarity poles facing each other across said gap, said gap having an entrance section, an exit section, a generally curved longitudinal path extending from said entrance section to said exit section around a transverse axis, and a face to face distance, measured parallel to said transverse axis that changes from said entrance section to said exit section, as a function of arc degree position around said transverse axis;

(b) rotor means mounted for rotation around an axis generally coincident with said transverse axis, said rotor including a predetermined number of rotor magnets disposed radially outwardly from said transverse axis and substantially within said gap, each pole of each rotor magnet being spaced from said stator pole face and aligned in a predetermined orientation with respect thereto, the magnet field of each of said rotor magnets interacting with the magnetic field of said stator magnet means; and (c) electronic control means for inducing an electromagnetic field from an external source of energy, said means for inducing an electromagnetic field being responsive to the relative rotational position of said rotor for successively interacting with the magnetic field of each of said rotor magnets to urge each of said rotor magnets towards the entrance section of the gap, whereby the magnetic field of each rotor magnet interacts with the magnetic field of said stator means and said means for inducing an electromagnetic field creating forces that urge said rotor magnets along the longitudinal path of said stator gap, causing the rotor to rotate around said transverse axis.

3. An electromagnetic rotary motor comprising:

(a) stator means including at least one pair of stator magnet means, the pole faces thereof in a predetermined generally parallel fixed spaced relationship that defines a gap therebetween with opposite polarity poles facing each other across said gap, one of said stator magnets being generally C-shaped defining a transverse axis with one end axially displaced from the other end to form a segment of a helix and the second of said stator magnets being an axisymmetrical mirror image of said first stator magnet to together define a gap having an entrance section, an exit section, a generally curved longitudinal path extending from said entrance section to said exit section, and an axial face to face distance that increases from said entrance section to said exit section;

(b) rotor means mounted for rotation around an axis generally coincident with said transverse axis, said rotor being generally disc-shaped and including a predetermined number of rotor magnets disposed radially outwardly from said transverse axis in a predetermined spaced relationship and substantially within said gap, each pole of each rotor magnet being spaced from said stator pole face and aligned in a predetermined orientation with respect thereto, the magnetic field of each of said rotor magnets interacting with the magnetic field of said stator magnet means; and (c) electronic control means for inducing an electromagnetic field from an external source of energy, said means for inducing an electromagnetic field being responsive to the relative rotational position of said rotor for successively interacting with the magnetic field of each of said rotor magnets to urge each of said rotor magnets towards the entrance section of the gap, whereby the magnetic field of each rotor magnet interacts with the magnetic field of said stator means and said means for inducing an electromagnetic field creating forces that urge said rotor magnets along the longitudinal path of said stator gap, causing the rotor to rotate around said transverse axis.

4. An electromagnetic rotary motor comprising:

(a) stator means including at least one pair of stator magnet means, the pole faces thereof in a predetermined generally parallel fixed spaced relationship that defines a gap therebetween with opposite polarity poles facing each other across said gap, each of said stator magnets being generally C-shaped defining a transverse axis and having a gradually increasing radius to form a segment of a spiral, the range of radii of one stator magnet being less than the range of radii of the other stator magnet, said stator magnets being coaxial and generally coplanar to together define a gap having an entrance section, an exit section, a generally curved longitudinal path extending from said entrance section to said exit section, and a radial face to face distance that increases from said entrance to said exit;

(b) rotor means mounted for rotation around an axis generally coincident with said transverse axis, said rotor being cup-shaped and including a predetermined number of rotor magnets disposed radially outwardly from said transverse axis in a predetermined spaced relationship and substantially within said gap, each pole of each rotor magnet being spaced from said stator pole faces and aligned in a predetermined orientation with respect thereto, the magnetic field of each of said rotor magnets interacting with the magnetic field of said stator magnet means; and (c) electronic control means for inducing an electromagnetic field from an external source of energy, said means for inducing an electromagnetic field being responsive to the relative rotational position of said rotor for successively interacting with the magnetic field of each of said rotor magnets to urge each of said rotor magnets towards the entrance section of the gap, whereby the magnetic field of each rotor magnet interacts with the magnetic field of said stator means and said means for inducing an electromagnetic field creating forces that urge said rotor magnets along the longitudinal path of said stator gap, causing the rotor to rotate around said transverse axis.

5. A motor as in claim 1 wherein the face to face distance between said stator pole faces increases from said entrance section to said exit section.

6. A motor as in claim 1 wherein the face to face distance between said stator pole faces decreases from said entrance section to said exit section.

7. A motor as in claim 1 wherein said stator means includes at least one pair of permanent magnets.

8. A motor as in claim 1 wherein said rotor means includes at least one permanent magnet.

9. A motor as in claim 1 wherein each of said rotor magnets is in repulsion with respect to the faces of said stator magnet means.

10. A motor as in claim 1 wherein each of said rotor magnets is in attraction with respect to the faces of said stator magnet means.

11. A motor as in claim 1 wherein that portion of said rotor magnets disposed within said gap has a generally rectangular cross sectional configuration when viewed radially.

12. A motor as in claim 1 wherein that portion of said rotor magnets disposed within said gap has a generally rectangular cross sectional configuration when viewed axially.

13. A motor as in claim 1 wherein that portion of said rotor magnets disposed within said gap has a generally cuneate cross sectional configuration when viewed radially.

14. A motor as in claim 1 wherein that portion of said rotor magnets disposed in said gap has a generally cuneate cross sectional configuration when viewed axially.

15. A motor as in claim 1 wherein said stator magnet means has generally planar facing surfaces.

16. A motor as in claim 1 wherein said stator magnet means has generally curved facing surfaces.

17. A motor as in claim 3 wherein the ends of each of said stator magnet means define an arc approximately the same number of degrees measured in the direction of rotation as the number of degrees of arc between the centers of adjacent rotor magnets.

18. A motor as in claim 3 wherein the field of said electronic control means for inducing an electromagnetic field is primarily located between the ends of said C-shaped stator magnets.

19. A motor as in claim 1 wherein said electronic control means for inducing an electromagnetic field induces, in a sequential timed relationship dependent upon rotor rotational position, an electromagnetic field to attract each of said rotor magnets as it exits said stator gap and subsequently induces an electromagnetic field to repulse each of said rotor magnets as it enters said stator gap, thereby enhancing rotation.

20. A motor as in claim 1 wherein said electromagnetic control means for inducing a magnetic field induces, in a sequential timed relationship dependent upon rotor rotational position, an electromagnetic field to repulse each of said rotor magnets as it exits said stator gap and subsequently induces an electromagnetic field to attract each of said rotor magnets as it enters said stator gap, thereby retarding rotation.

21. A motor as in claim 1 wherein said electronic control means for inducing a magnetic field comprises:
 (a) electromagnetic field means to selectively induce a predetermined magnetic field proximate said stator gap; and
 (b) signal means responsive to the relative rotational position of said rotor shaft to energize said electromagnetic field means.

22. A motor as in claim 1 wherein the outer surface of said rotor magnets is generally convex and the inner surface of said rotor magnets is generally concave.

23. A motor as in claim 1 wherein the inner and outer surfaces of said stator magnet means are at a constant radial distance from said transverse axis, defining an air gap at a constant radial distance from said transverse axis.

24. A motor as in claim 1 wherein the radial distance from said transverse axis to the innermost stator gap face decreases from said gap entrance section to said exit section, the radial distance from said transverse axis to the outermost stator gap face increases from said entrance section to said exit section, and the radial distance from said transverse axis to the midpoint between said stator gap faces is constant.

25. A motor as in claim 1 wherein said stator magnet means are selectively moveable to change the distance across said gap, thereby selectively changing the magnetic flux thereacross.

26. A motor as in claim 1 wherein said electronic control means for inducing an electromagnetic field comprises:
 (a) sensor means for monitoring the actual rotational position of said rotor and generating a signal representative thereto;
 (b) reference means for generating a signal representing a desired rotor rotational position;
 (c) comparator means responsive to said sensor means signal and said reference means signal for generating an error signal; and
 (d) means for generating an electromagnetic field in response to said error signal to selectively enhance or retard rotation of said rotor to minimize the difference between said rotor actual rotational position and said rotor desired rotational position.

27. A motor as in claim 1 wherein each rotor magnet has a leading circumferential portion and a trailing circumferential portion at opposite ends thereof with respect to the direction of rotation, the distance, measured parallel to said transverse axis, from said rotor magnet leading portion to said stator face being different than the distance from said rotor magnet trailing portion to said stator face.

28. A motor as in claim 1 wherein each rotor magnet has a leading circumferential portion and a trailing circumferential portion at opposite ends thereof with respect to the direction of rotation, the distance, measured perpendicular to said transverse axis from said rotor magnet leading portion to said stator face being different that the distance from said rotor magnet trailing portion to said stator face.

* * * * *

UNITED STATES PATENT AND TRADEMARK OFFICE
CERTIFICATE OF CORRECTION

PATENT NO. : 4,571,528

DATED : February 18, 1986

INVENTOR(S) : Daniel W. McGee, Stephan Rosinski, Claude S. Setzer

It is certified that error appears in the above-identified patent and that said Letters Patent is hereby corrected as shown below:

Column 10, line 19, "at a mixed" should read -- at a fixed --.

Signed and Sealed this

Twenty-ninth Day of July 1986

[SEAL]

Attest:

DONALD J. QUIGG

Attesting Officer

Commissioner of Patents and Trademarks